United States Patent [19]

Moberg et al.

[11] Patent Number: 4,844,114

[45] Date of Patent: Jul. 4, 1989

[54] PRESSURE-DROP SENSOR VALVE

[75] Inventors: Gary Moberg, Sycamore, Ill.; James Hobson, Taverse City, Mich.

[73] Assignee: Contractor Tool and Equipment Textron Inc., Rockford, Ill.

[21] Appl. No.: 134,756

[22] Filed: Dec. 18, 1987

[51] Int. Cl.[4] .............................................. F16K 17/00

[52] U.S. Cl. ...................................... 137/115; 60/468; 83/617; 83/639; 91/451; 137/467

[58] Field of Search ....................... 137/115, 459, 467; 83/617, 639; 60/468; 91/451

[56] References Cited

U.S. PATENT DOCUMENTS

| | | | |
|---|---|---|---|
| 2,793,498 | 5/1957 | Banker | 137/115 X |
| 4,189,983 | 2/1980 | Fassbender et al. | 91/451 X |
| 4,214,496 | 7/1980 | Carrieri | 83/617 |
| 4,292,990 | 10/1981 | Pareja | 137/115 |
| 4,344,451 | 8/1982 | Büdecker et al. | 137/115 X |
| 4,469,125 | 9/1984 | Keeney | 137/467 |

FOREIGN PATENT DOCUMENTS

| | | | |
|---|---|---|---|
| 2446985 | 9/1980 | France | 137/115 |

*Primary Examiner*—Stephen Hepperle
*Attorney, Agent, or Firm*—R. A. Giangiorgi

[57] ABSTRACT

There is disclosed a pressure-drop sensor valve system for controlling the movement of a fluid operated, ram-type device, such as that used to drive a panel punch. The valve-like device includes a main passage having an inlet for pressurized fluid and an outlet connectable to the ram-type device. Disposed intermediate said inlet and outlet is a fluid chamber. A poppet valve is positioned between said fluid chamber and an accumulator chamber in the body of the device. A fluid by-pass is connected to the fluid passage and a reservoir, and is blocked when the poppet valve is closed and opened when said valve is opened. A piston member is provided with its stem in the accumulator chamber opposite the poppet valve, both said member and valve being slightably movable by separate compression springs. A check valve is positioned in an axial passage of the poppet valve. The poppet valve, check valve, and piston operating in response to fluid pressure variations in the fluid passage and the accumulator chamber caused by pressure demands in the operation of the ramp so as to open the by-pass passage immediately after the punch breaks through the panel and vent pump discharge flow to the reservoir to halt further movement of the ram and punch. The poppet valve may be reset either manually or automatically.

14 Claims, 8 Drawing Sheets

PRESSURE-DROP SENSOR VALVE

FIELD OF THE INVENTION

This invention relates to a pressure drop sensor valve which effects the flow of a pressurized fluid from the supply line to a return line to retard the movement of a fluid operated mechanism upon completion of the task of the mechanism.

BACKGROUND OF THE INVENTION

When a knock-out punch actuated by a hydraulically driven ram pierces through sheet metal being punched, the pump continues to supply hydraulic fluid to the ram despite the punch having completed its task and having no resistance in front of it except the die. The result is possible damage to the punch by its bottoming out against the die. Prior patents which generally relate to systems that sense a sudden drop in system fluid pressure and to thereupon drastically reduce the outlet unit pressure of the pressurized fluid actuating a tool or a punch piston include the following:

1. U.S. Pat. No. 4,099,436 issued July 11, 1978, describes a punch drive control system employing an air pressure switch to sense a sudden drop in pressure upon the punch's piercing the sheet material and to actuate air valves to bias the first punch piston as well as a second piston to move in the reverse direction away from the sheet material. The system is said to eliminate noise and vibration normally occurring when the punch just breaks through the sheet material.

2. U.S. Pat. No. 3,138,174 issued June 223, 1964, describes a fluid flow valve substantially reducing a flow of fluid therefrom when downstream pressure is drastically reduced. The valve includes only a single spring biased valve operable on differential inlet/outlet pressure to shut off fluid flow if the outlet pressure is drastically reduced relative to inlet pressure.

3. U.S. Pat. No. 2,478,210 issued Aug. 9, 1949, describes an automatic shut-off valve for interrupting supply pressure between an inlet port and an outlet port.

4. U.S Pat. No. 1,531,406 issued Mar. 31, 1925, illustrates a governor for fluid-pressure-actuated tools to control over-speeding or racing of the tool when it is disengaged from a workpart by automatically reducing the supply of air to the tool.

5. U.S. Pat. No. 4,543,976 issued Oct. 1, 1985, describes a control valve for a vehicle hydraulic system. The valve arrangement shown is used to control or limit charging pressure of a hydraulic accumulator by a high pressure pump and to recharge when accumulator pressure drops to a so-called "cut-in" pressure as a result of use of the vehicle hydraulic system, for example, power steering. A sudden drop in line pressure of the system would cause recharging of the accumulator by the pump.

None of the above inventions sets forth a system that can overcome the problems encountered by operators of hydraulic knock-out punch systems.

SUMMARY OF THE INVENTION

Accordingly, it is an object of this invention to provide a pressure-drop sensor valve system that detects the instant of breakthrough of a wall by a punch and to immediately prevent further linear motion of a hydraulically operated ram actuating the punch.

It is another object of this invention to provide a pressure-drop sensor valve system as described above that is automatically reset.

It is another object of this invention to provide a pressure-drop sensor valve system as described above that is reset manually.

In accordance with these and other objectives there is provided a pressure-drop sensor valve system for limiting the movement of a fluid-operated mechanism operating between upper and lower fluid unit pressures, in particular a fluid-operated ram driving a punch. A fluid passage through the valve body having an inlet side from a source of pressurized fluid and an outlet side leading to the fluid-operated mechanism includes a fluid cavity in the valve body between the inlet and outlet sides. A poppet valve has its head in the fluid cavity and its stem, which is slidably positioned in a bore in the valve body, extending into an accumulator chamber in the valve body. An axial passage in the poppet valve fluidly connects the fluid cavity and the accumulator chamber. A fluid bypass passage connected to the fluid passage and leading to a reservoir is shut when the poppet valve is closed and is open when the poppet valve is open. A piston has a piston head positioned in the accumulator chamber opposite the poppet stem. The piston and the valve are each slidably movable by separate compression springs braced against the ends of the valve body. A ball-check valve is positioned in the axial passage of the poppet valve. The poppet valve, the ball-check valve, the piston, and the valve and piston springs operate in response to fluid pressure variations in the fluid passage and in the accumulator chamber caused by unit pressure demands and variations in the operation of the ram so as to open the bypass passage immediately after the punch breaks through the panel being punched and by pass to the reservoir all pump discharge flow so as to bring the forward movement of the ram and punch to a halt. The poppet valve can be reset either manually or automatically to enable the next punching operation. The accumulator chamber can be located in a blind reservoir in the body.

The present invention will be better understood and the objects and important features, other than those specifically enumerated above, will become apparent when consideration is given to the following details and descriptions, which when taken in conjunction with the annexed drawings, describes, discloses, illustrates, and shows preferred embodiments of the present invention and what is presently considered to be the best mode of practice in the principle thereof. Other embodiments or modifications may be suggested to those having the benefit of the teachings herein. Such other embodiments or modifications are intended to be reserved especially as they fall within the scope and spirit of the subjoined claims.

DESCRIPTION OF THE PREFERRED EMBODIMENTS

Figure 1:
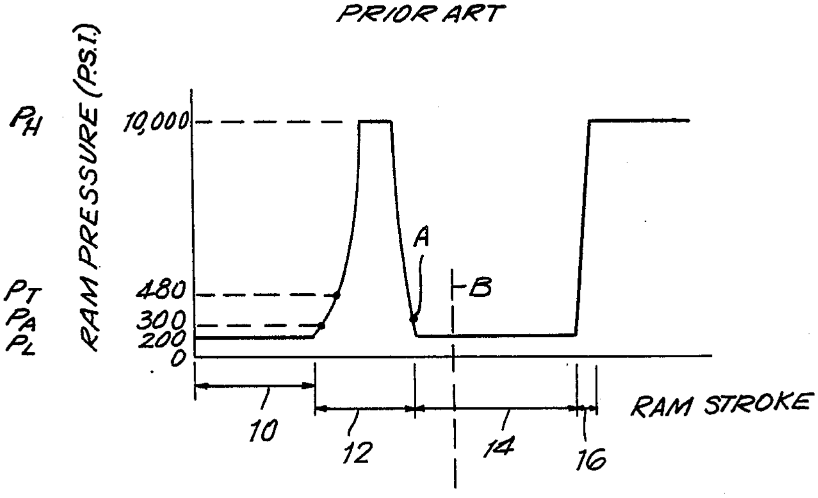
FIG. 1 PRIOR ART
FIG. 1 is a graph of a pressure characteristic curve of a typical hydraulically operated ram during a prior art punching operation.

Reference is now made in detail to the drawings wherein the same reference numerals are used throughout for the same or similar parts.

A graph of pressure versus travel for a prior art hydraulically operated ram during a punching operation is shown in FIG. 1. The first phase of the punching operation, indicated by numeral 10, represents the initial high-speed advance of the hydraulic ram (not shown) of the system. During the first phase the pump flow is at a maximum and the ram and pump unit pressure are at a minimum, shown as being 200 p.s.i. as an example of a typical system. The second phase of the punching operation, indicated by numeral 12, represents the low-speed advance of the ram during the actual punching process. During the second phase the ram and pump unit pressure quickly rise above 200 p.s.i. to a high maximum unit pressure, shown as being 10,000 p.s.i. as an example of a typical system. Pump flow is at a minimum during this time. The third phase, indicated by numeral 14, represents the movement of the punch and ram after the sudden breakthrough of the punch through the panel being punched. During this phase pump and ram pressure drop back to 200 p.s.i. as the punch rapidly advances. The fourth and last phase, indicated by numeral 16, represents the bottoming out of the punch against the die, thus possibly causing damage to the punch. Unit pressure rises back up to 10,000 p.s.i. at this time.

A point "A" shown in FIG. 1 at the bottom of the downside of the second phase of the operation represents a desirable point or threshold $P_T$ of venting of the system pressure, either automatically or by an operator, so that the ram will not advance the punch against the die. Alternatively, the system can be shut down by the operator by shut-off of the pump by the operator, indicated by a vertical dashed line "B".

A pressure-drop sensor valve system 18 illustrated in FIGS. 2–7 accomplishes a limitation of the movement of a hydraulic ram actuating a knock-out punch (not shown) by a venting at point A therein of the type of hydraulic system represented by FIG. 1.

The following description makes reference to pressures as high as 10,000 psi, and lower values. These values are used herein solely for the sake of an operational example, operating in a pressure range similar to that used by the prior art described in relation to FIG. 1. The maximum pressure is not limited to 10,000 p.s.i. and may be greater or less. With proper component area sizings and spring selections, the valve in accordance with the invention can be designed for any differential pressure, $P_L$ (low) to $P_H$ (high) and a selected intermediate threshold pressure $P_T$ for venting (as explained hereinafter).

A source of pressurized liquid, such as a pump (not shown) delivers the pressurized liquid to the ram between a lower unit pressure $P_L$ of, for example, 200 p.s.i. and an upper unit pressure $P_H$ of, for example, 10,000 p.s.i. Sensor valve system 18 includes a valve body 20 and a supply passage 22 extending through body 20 and having an inlet side 24 from the pump and an outlet side 26 in connection with the ram. Supply passage 22 passes pressurized fluid, indicated by arrow 28, from the pump to the ram at unit pressures ranging between a lower unit pressure of $P_L$ and an upper unit pressure $P_H$. A return passage 30 in body 20 has an outlet side 32 proximate to inlet side 24 of supply passage 22 and outlet side 26. Return passage 30 directs fluid 28 from supply passages 22 and 26 from body 20 as a return fluid indicated by arrow 34 to a reservoir.

A fluid cavity 36 is formed in valve body 20 midway between inlet and outlet sides 24 and 26 of supply passage 22 so that pressurized fluid 28 entering inlet side 24 passes through cavity 36 en route to outlet side 26. Supply passage 22 thus includes fluid cavity 36.

An accumulator chamber 38 that is formed by a sleeve 40 connected to the interior of body 20 holds a quantity of fluid. Accumulator chamber 38 and fluid cavity 36 are located within valve body 20.

Figure 2:
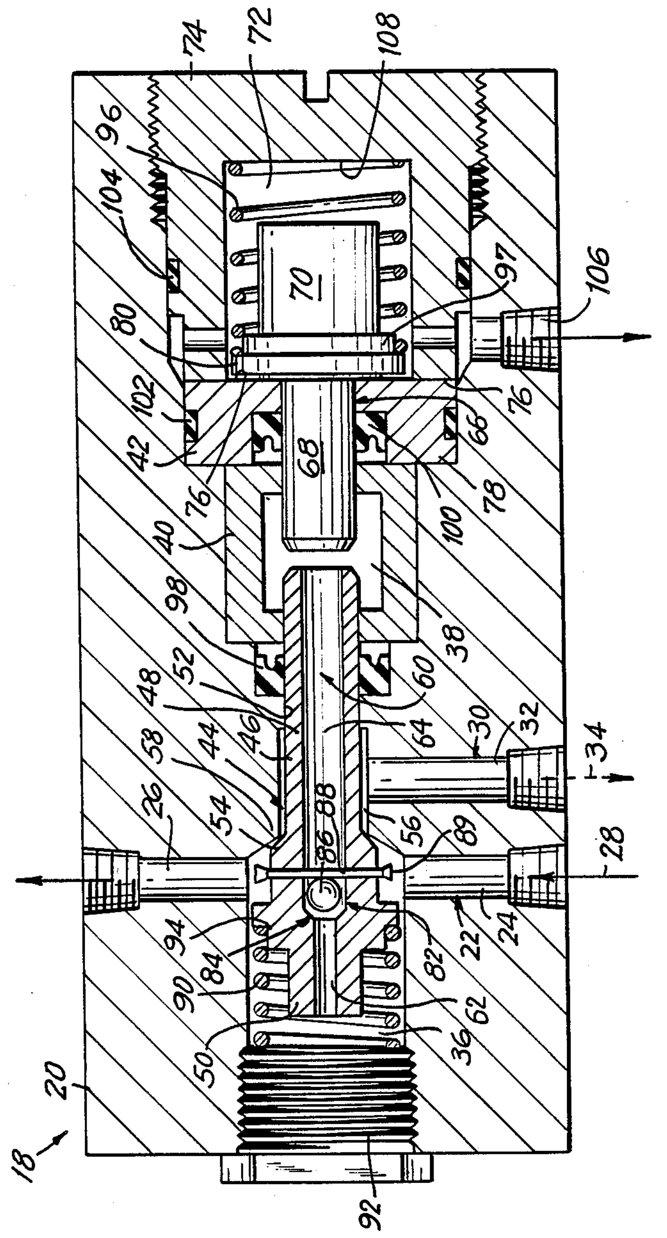
FIG. 2 is a cross-sectional side view showing a pressure-drop sensor valve in its position according to the present invention in the first phase of the punching operation during the high-speed advance of the ram.

A poppet valve 44 includes a poppet stem 48 and a poppet head 50, stem 48 slidably extending through sleeve 40 so that the end portion of stem 48 is positioned in accumulator chamber 38 in fluid communication with the fluid therein. Poppet head 50 is positioned in fluid cavity 36. Poppet valve 44, in particular poppet stem 48, is slidable in a bore 52 that extends through body 20 and a wall of sleeve 40, that is, between fluid cavity 36 and accumulator chamber 38. Poppet valve 44 has a conical poppet surface 54 positioned between stem 48 and head 50, which position is between fluid cavity 36 and an annular bypass 56, which is formed in valve body 20 as a continuation of bore 52 and which connects fluid cavity 36 with outlet side 32 of return passage 30. Return passage 30 thus includes annular bypass line 56. The major diameter of bypass 56 is smaller than the diameter of fluid cavity 36 with a conical poppet valve seat 58 formed therebetween. Poppet surface 54 is illustrated in FIG. 2 positioned in its closed mode pressed against poppet valve seat 58 so as to block off substantially all flow of pressurized fluid from fluid cavity 36 to bypass 56. An axial passage 60 in poppet valve 44 extending through poppet head 50 and poppet stem 48 fluidly joins fluid cavity 36 and accumulator chamber 38. Axial passage 60 includes a narrow portion 62 in fluid connection with fluid cavity 36 and a wide portion 64 in fluid connection with accumulator chamber 38. The diameter of narrow portion 62 is less than the diameter of wide portion 64.

An accumulator piston 66 includes a head portion 68 extending through a bore of a wall of sleeve 40 in fluid communication with accumulator chamber 38 and a rear portion 70 positioned in a blind piston cavity 72 formed in body 20, piston cavity 72 being located at the opposite end of body 20 from fluid cavity 36. Piston cavity 72 is particularly formed in a sealing cap 74 screwed into one end of valve body 20 with one side of piston cavity 72 being defined by a wall 76 of a bushing 78 positioned between sleeve 40 and cap 74. Piston 66 has a stop flange 80 located between head portion 68 and rear portion 70 and which is in abutting relationship with wall 76 so that accumulator piston 66 cannot advance into accumulator chamber 38 from its position shown in FIG. 2. Head portion 68 of piston 66 also extends through a bore of bushing 78 which is aligned with the bore of sleeve 40.

A ball-check valve 82, which includes an angled ball seat 84 located between narrow and wide portions 62 and 64 of axial passage 60 and a ball 86 positioned in wide portion 64, is located in axial passage 60. A stop pin 88 extending diametrically through poppet stem 48 across wide portion 64 holds ball 86 in a position proximate to ball seat 84. Stop pin 88 traps ball 86 proximate to ball seat 84. Stop pin 88 forms precision annular orifices with the adjacent surfaces of poppet valve body 46 so that when a unit pressure differential exists between axial passage 60 and fluid cavity 36 a small amount of pressurized fluid flows therebetween. Stop pin 88 has swaged retaining ends 89.

A valve compression spring 90 mounted within fluid cavity 36 is operatively coiled around poppet head 50 with one end of valve spring 90 being braced against the inner end of a sealing plug 92 screwed into the end of valve body 20 and the other end of valve spring 90 being braced against a valve spring seating flange 94. The inner end of plug 92 is spaced from poppet head 50 in the position of poppet valve seat 58 illustrated in FIG. 2. Plug 92 and cap 74 are positioned at opposite ends of valve body 20.

A piston compression spring 96 is mounted within piston cavity 72 and operatively coiled around rear portion 70 of accumulator piston 66 with one end of spring 96 being braced against cap 74 and the other end of spring 96 being braced against a piston spring seating flange 97, which is combined with stop flange 80.

A seal 98 is positioned around poppet valve body 46 adjoining sleeve 40; and a seal 100 is positioned around head portion 68 of piston 66 adjoining the other end of sleeve 40. An O-ring 102 is positioned around bushing 42; and an O-ring 104 is positioned around cap 74. A fluid passage 106 vents any fluid from piston cavity 72 that may have entered from accumulator chamber around seal 102.

Phase one of the operation of valve system 18, which is illustrated in FIG. 2, is the same as the first phase of the prior art system set forth above in relation to FIG. 1 and extends over the movement of the hydraulic ram during the high-speed advance of the ram during the maximum pump flow where the lower unit pressure is approximately 200 p.s.i. for the embodiment under discussion. Poppet valve 44 is in a closed position with poppet surface 54 pressed against poppet valve seat 58 so as to prevent fluid flow into return passage 30 from supply passage 22 via fluid cavity 36. Accumulator piston 66 is in an extended position with head portion 68 positioned in accumulator chamber 38 proximate to poppet valve 44 in particular to the terminus of stem 48. Valve compression spring 90 is in its first biased mode wherein poppet valve 44 is maintained in its closed position. The unit pressure is the same throughout the entire valve system in phase one so that the unit pressure exerted by valve spring 90 need not overcome any opposing pressure. Return fluid flow escaping into return passage 30 is negligible during this time.

Figure 3:
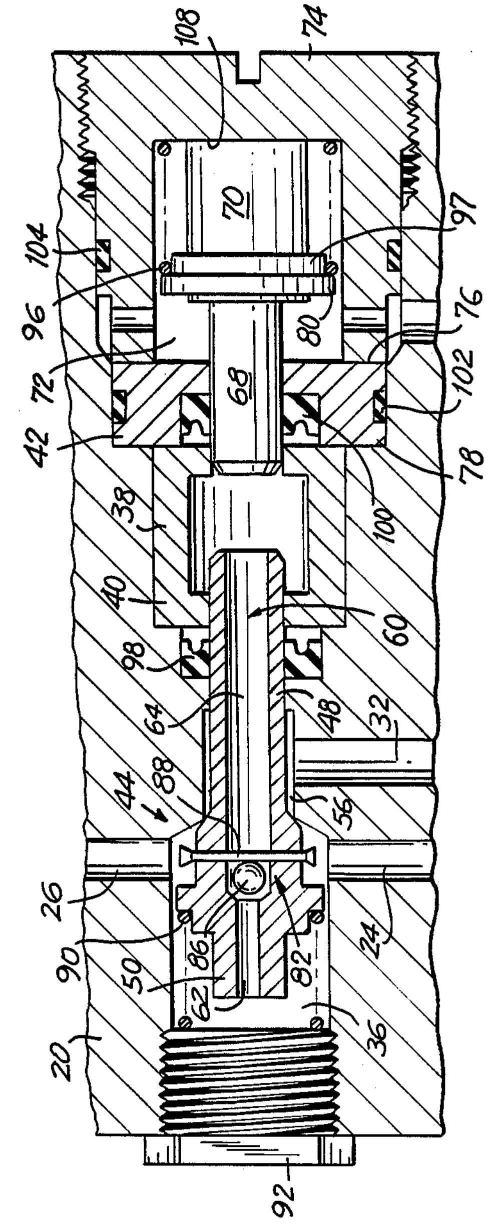
FIG. 3 is a cross-sectional view similar to FIG. 2 showing the sensor valve in its position in the second phase of the punching operation during the low-speed, high-pressure advance of the ram when the punching occurs.

Phase two of the operation of valve system 18, which is illustrated in FIG. 3, covers the start of the upside of the unit pressure curve in FIG. 1. Phase 2 is the start of a low-speed, high-pressure punching operation with pump flow at a minimum and with pump and ram at a unit pressure greater than 200 p.s.i. When the ram pressure exceeds a certain unit pressure, which is 300 p.s.i. in the embodiment of the invention under discussion (see FIG. 1), accumulator piston 66 moves from its extended position illustrated in FIG. 2 towards its retracted position. Pressurized fluid from supply passage 22 and axial passage 60 exerts a pressure in accumulator chamber 38 at this time because the unit pressure existing in accumulator chamber 38 is equal to the pressure existing in supply passage 22. As a result of this, accumulator piston 66 is forced by the unit pressure to move from its extended position illustrated in FIG. 2 towards its fully retracted position overcoming spring 96. The movement of accumulator piston 66 towards a retracted position allows pressurized fluid from axial passage 60 to enter accumulator chamber 38. The flow of pressurized fluid just described passes through the area of ball-check valve 82. Poppet valve 44 remains closed during this time due to the combined force of valve spring 90 and the force produced by fluid pressure within cavity 36 acting on the area of valve poppet seat 54, which combined force is opposite to and greater than the force produced by fluid pressure within cavity 38 acting on the area of poppet valve stem 48. The pressure is equal in the fluid cavity 36 and accumulator chamber 38 until just after breakthrough of the punch.

Phase two of the operation of system 18 continues as the unit pressure at the ram exceeds a certain unit pressure, which in the embodiment of the invention being discussed is approximately 480 p.s.i., and accumulator piston 66 is forced by the approximately 480 p.s.i. pressure in accumulator chamber 38 to be moved fully into its fully retracted mode as illustrated in FIG. 3. Piston spring 96 is fully biased in the retracted position of accumulator piston 66. Head portion 68 is fully withdrawn from accumulator chamber 38 and rear portion 70 is pressed against rear wall 108 of piston chamber 72. Head portion 68 is still in fluid connection with accumulator chamber 38 in the withdrawn position. Ball 86 is contained by stop pin 88 against the force of the flow of pressurized fluid from fluid cavity 36 to accumulator chamber 38.

Phase two continues as the ram presses the punch through the panel to be penetrated and the fluid unit pressure of the system quickly rises to the operational upper unit pressure, which is 10,000 p.s.i. in the embodiment of the invention under discussion as illustrated in FIG. 1.

Figure 4:
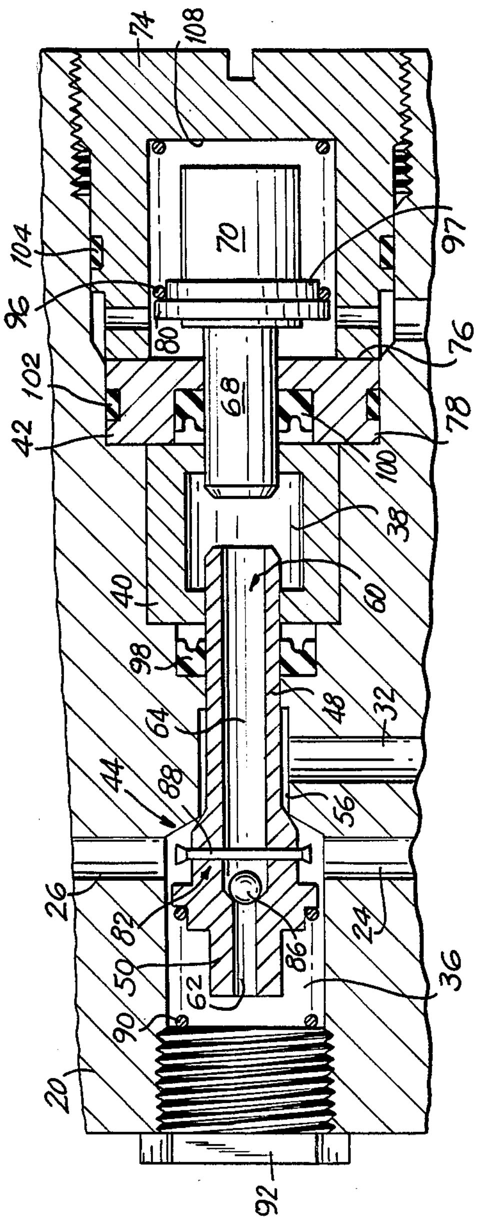
FIG. 4 is a cross-sectional view similar to FIG. 3 showing the sensor valve in its position during the third phase of the punching operation immediately after the breakthrough by the punch.
Figure 6:
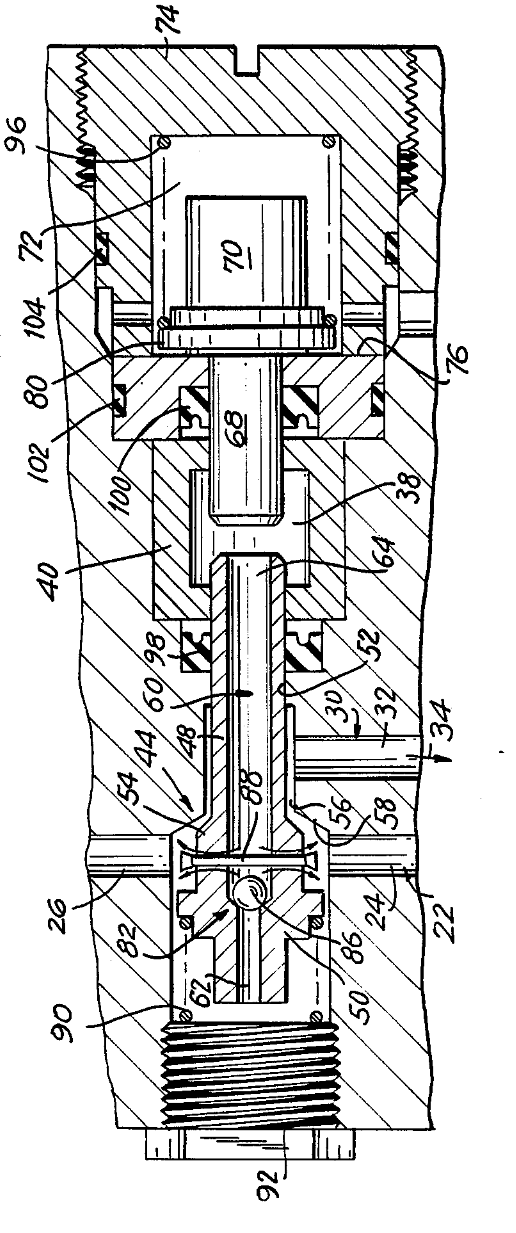
FIG. 6 is a cross-sectional view similar to FIG. 5 showing the sensor valve in its position after the pump has been shut off and the poppet begins to seat automatically.

Phase three of sensor valve system 18, which is illustrated in FIG. 4, occurs immediately after the punch breaks through the panel, and the pump and ram unit pressure rapidly drops from the upper operational unit pressure of approximately 10,000 p.s.i. back to a unit pressure $P_T$ at which sensor valve system 18 is automatically vented, namely, 480 p.s.i. as illustrated by point A in FIG. 1 so that the ram will not advance the punch against the die. At the point that the 10,000 p.s.i. unit pressure in accumulator chamber 36 is reduced to less than 480 p.s.i., accumulator piston 66 will begin a motion from its retracted position back to its fully extended position as illustrated in FIG. 6 by reason of the bias exerted by piston spring 96, which exerts a unit pressure bias force of approximately 480 p.s.i., which is greater than the unit pressure of slightly less than 480 p.s.i. in fluid cavity 38. The start of this motion is illustrated in FIG. 4, where head portion 68 has partly moved into accumulator chamber 38.

FIG. 4 also illustrates the closing of ball-check valve 82 by the movement of ball 86 into ball seat 84 caused by the movement of fluid from accumulator chamber 38 towards fluid cavity 36. The fluid movement results from the entry of accumulator piston 66 into accumulator chamber 38 and the consequent displacement of fluid from accumulator chamber 38. Poppet valve 44 remains closed so that fluid in fluid cavity 36 is blocked from entering bypass 56.

Figure 5:
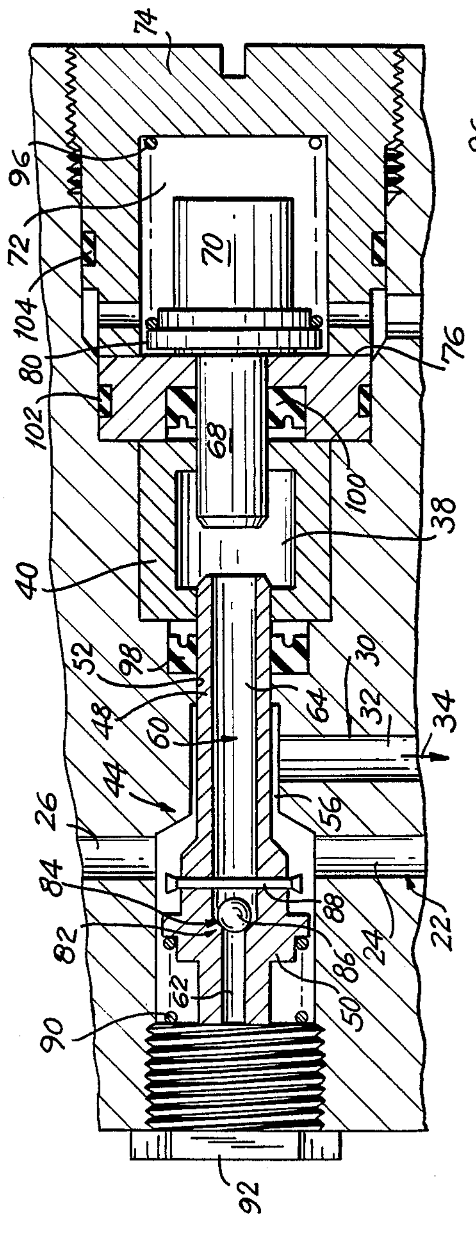
FIG. 5 is a cross-sectional view similar to FIG. 4 showing the sensor valve in its position during the fourth phase of the punching operation when pump flow is diverted to a reservoir and motion of the ram is arrested.

Phase four of sensor valve system 18, which is illustrated in FIG. 5, follows the closing of ball-check valve 82. Unit pressure exerted by the pump continues to fall from 480 p.s.i. to approximately 200 p.s.i. subsequent to the breakthrough of the panel by the punch. Accumulator piston 66 moves farther into accumulator chamber 38. During phase four pressure against ball 86 as a result of fluid displaced from accumulator chamber 38 causes poppet valve 44 to slide in elongated bore 52 and valve spring 90 to move from its partly biased position to its fully biased position. Poppet surface 54 is forced away from poppet valve seat 58 with the result that bypass 56 is unblocked and fluid from fluid cavity 36 passes into bypass 56 and outlet side 32 of return passage 30 and is finally vented from the system as return fluid 34. The opening of poppet valve 44 causes the rapid arrest of motion by the hydraulic ram. The operator may then turn off the pump. Alternatively, the operator may close the shut-off valve (not shown) from the pump to supply passage 22. Poppet valve 44 is held in its open position and valve spring 90 held in its fully biased mode by way of the fluid trapped within accumulator chamber 38 since a pressure differential exists during phase four between fluid cavity 36 and accumulator chamber 38 with the unit pressure in accumulator chamber 38 being approximately 480 p.s.i. as produced by action of the spring 96. The biased force exerted by valve spring 90 in its fully biased mode is less than the opposing force produced by fluid pressure within cavity 38 acting on the area of poppet valve stem 48. In its open position poppet valve 44 is pressed against the inner wall of plug 92.

Phase five of the operation of sensor valve system 18, the reseating of poppet valve 44, is illustrated in FIG. 6. When the pump is shut off, bias is applied by valve spring 90 to poppet valve 44 towards the close position. This motion is restricted by the greater pressure in the accumulator chamber 38 and in axial passage 60 relative to the pressure in supply passage 20. This pressure differential is applied at ball 86 so as to press ball 86 into ball seat 84 and also at ball 86 so as to press poppet valve 44 from seating against poppet seat 58. During this time of pressure differential, a flow of fluid from axial passage 60 is metered through the orifices of metering pin 88. When the fluid unit pressure existing in accumulator chamber 38 "bleeds down" across metering pin 88 into fluid cavity 36 to a fluid unit pressure less than the bias of valve spring 90, a time period which is determined by the size of the orifices of metering pin 88, such as about 10 seconds, poppet valve 44 reseats so as to close bypass passage 56. Ball 86 also moves from its seated position about this time so that ball-check valve 82 assumes its open position. Piston 66 returns to its fully extended position with flange 80 contacting the wall 76. The operator then starts the pump for the next punching operation.

Another embodiment of the present invention illustrated in FIGS. 7-10 is a pressure-drop sensor valve 110 that includes a manually operated mechanism for resetting the valve after the punching operation rather than the automatic reset feature of pressure-drop sensor valve system 18 described above.

Sensor valve 110 includes a valve body 112 and a fluid supply passage 114 extending through body 112 and having an inlet side 116 from the pump and an outlet side 118 in connection with the ram. Supply passage 114 passes pressurized fluid, indicated by arrow 120, from the pump to the ram at unit pressures ranging between a lower unit pressure of 200 p.s.i. and an upper unit pressure of 10,000 p.s.i. A return passage in body 20 has an outlet side 124 proximate to inlet side 116 of supply passage 114. Return passage 122 vents a quantity of pressurized fluid 120 from supply passage 114 and from body 20 as a return fluid indicated by arrow 126 to a reservoir.

A fluid cavity 128 is formed in a sleeve 130 mounted in valve body 112 between inlet and outlet sides 116 and 118 of supply passage 114 so that pressurized fluid 120 entering inlet side 116 passes through fluid cavity 128 en route to outlet side 118. Supply passage 114 thus includes fluid cavity 128.

Figure 7:
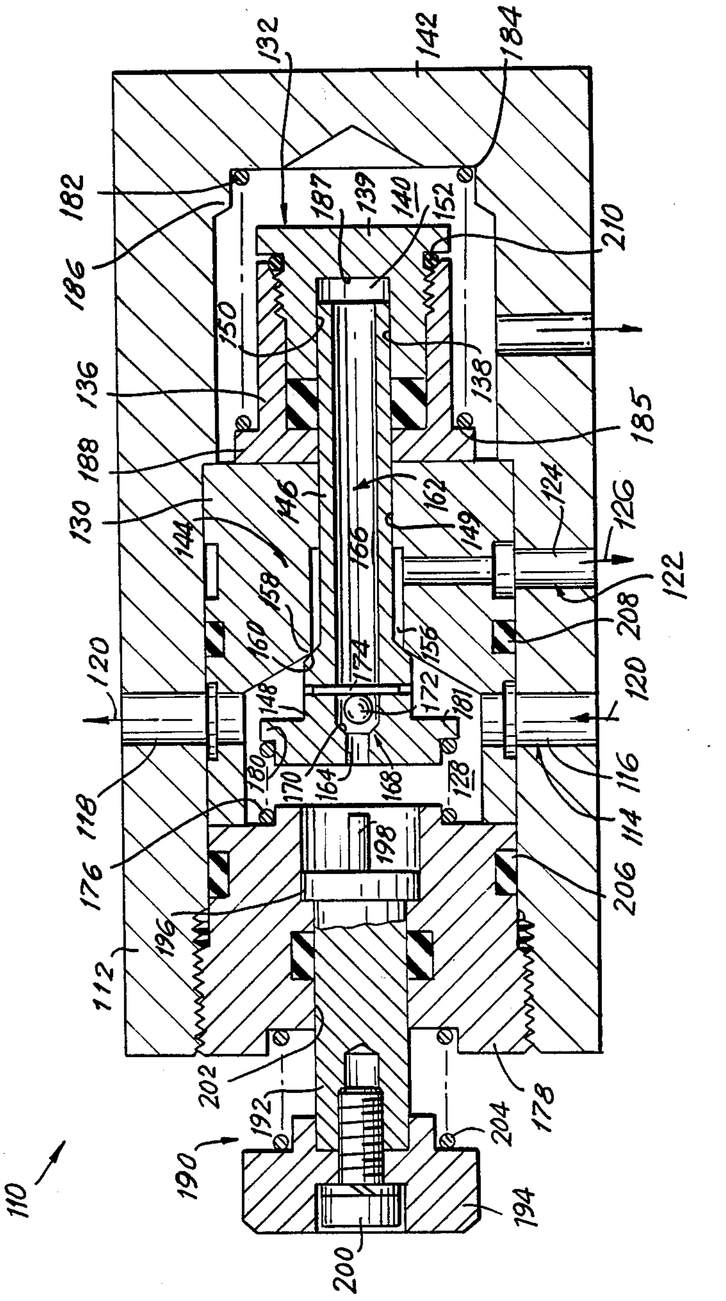
FIG. 7 is a cross-sectional view analogous to FIG. 2 showing another embodiment of the sensor valve including a manual seating mechanism during the first phase of the punching operation.

A piston 132 made from a rear piston portion 134 screwed into a front piston portion 136 forms a cylindrical passage 138. Piston 132 is positioned in a blind piston cavity 140 formed in valve body 112 adjoining sleeve 130. Piston 132 is in abutting relationship with the end wall of sleeve 130 and is spaced from the sealing end wall 142 of valve body 112 when positioned as shown in FIG. 7.

A poppet valve 144 includes an elongated stem 146 and a head 148. Stem 146 is slidably positioned in a cylindrical bore 149 in sleeve 130 and in piston bore 138. Piston 132 has a blind recess 150 that slidably receives the end portion of stem 146. Head 148 is positioned in fluid cavity 128 in fluid communication with the pressurized fluid therein. Blind recess 150 includes an accumulator chamber 152 which extends beyond the terminus of poppet stem 146 to the inner wall of rear piston portion 134. Both piston 132 and poppet valve 144 are in fluid communication with accumulator chamber 152. Poppet head 148 is positioned in fluid cavity 128 so that poppet valve 144 is in fluid communication with the pressurized fluid therein. Poppet valve 144 has a conical surface 160 positioned between fluid cavity 128 and an annular bypass 156, which is formed in sleeve 130 as a continuation of cylindrical bore 138 and which connects fluid cavity 128 with outlet side 124 of return passage 122. Return passage 122 thus includes bypass 156. The major diameter of bypass 156 is smaller than the diameter of fluid cavity 128 with a conical poppet valve seat 158 formed therebetween. A poppet conical surface 160 extending around poppet valve 144 at an angle and located between poppet stem 146 and poppet head 148 is illustrated in FIG. 7 positioned in its closed mode against poppet valve seat 158 so as to block off substantially all flow of pressurized fluid from fluid cavity 128 to bypass 156. An axial passage 162 in poppet valve 144 extending through stem 146 and head 148 fluidly joins fluid cavity 12 and accumulator chamber 152. Axial passage 162 includes a narrow portion 164 in fluid connection with fluid cavity 128 and a wide portion 166 in fluid connection with accumulator chamber 152. The diameter of narrow portion 164 is less than the diameter of wide portion 166.

A ball-check valve 168, which includes an angled ball seat 170 located between narrow and wide portions 164 and 166 of axial passage 162 and a ball 172 positioned in wide portion 166, is located in axial passage 162. A stop pin 174 extending diametrically through poppet stem 146 across wide portion 166 holds ball 172 in a position proximate to ball seat 170. Stop pin 174 traps ball 172 proximate to ball seat 170.

A valve compression spring 176 mounted within fluid cavity 128 is operatively coiled around poppet head 148 with one end of valve spring 176 being braced against the inner end of a sealing plug 178 screwed into the end valve body 112 and the other end of valve spring 176 being braced against a valve spring seating flange 180. The inner end of plug 178 is spaced from poppet head 148 in the position of poppet valve 144 illustrated in FIG. 7. Plug 178 and end wall 142 of valve body 112 are positioned at opposite ends of valve body 112.

A piston compression spring 182 is mounted within piston cavity 140 and operatively coiled around front piston portion 136 of piston 132 with one end of piston spring 182 being braced against a cylindrical spring seat 184 and the other end of piston spring 182 being braced against a piston spring seat 185, which is combined with inner end wall 188 of piston 132.

A plunger 190 includes a cylindrical plunger rod 192 having opposed inner and outer ends, the outer end being connected to a knob 194 and the inner end having a stop flange 196. A rod 198 connected to stop flange 196 and which extends into fluid cavity 128 is axially aligned with and spaced from narrow portion 164 of axial passage 162 of poppet valve 144. Knob 194 is secured to the outer end of rod 192 by a countersunk screw 200. Rod 192 is slidably movable in a bore 202 extending through plug 178. A plunger compression spring 204 is positioned around rod 192 between a spring seat formed by knob 194 and the outer wall of plug 78. Plunger 190 is movable between an inactivated withdrawn position shown in FIGS. 7–9 and an activated inward position shown in FIG. 10.

An O-ring 206 is positioned around sealing plug 178; and an O-ring 208 is positioned around sleeve 130. A seal 210 is positioned around rear portion 134 of piston 132 adjacent to front portion 136.

Figure 11:
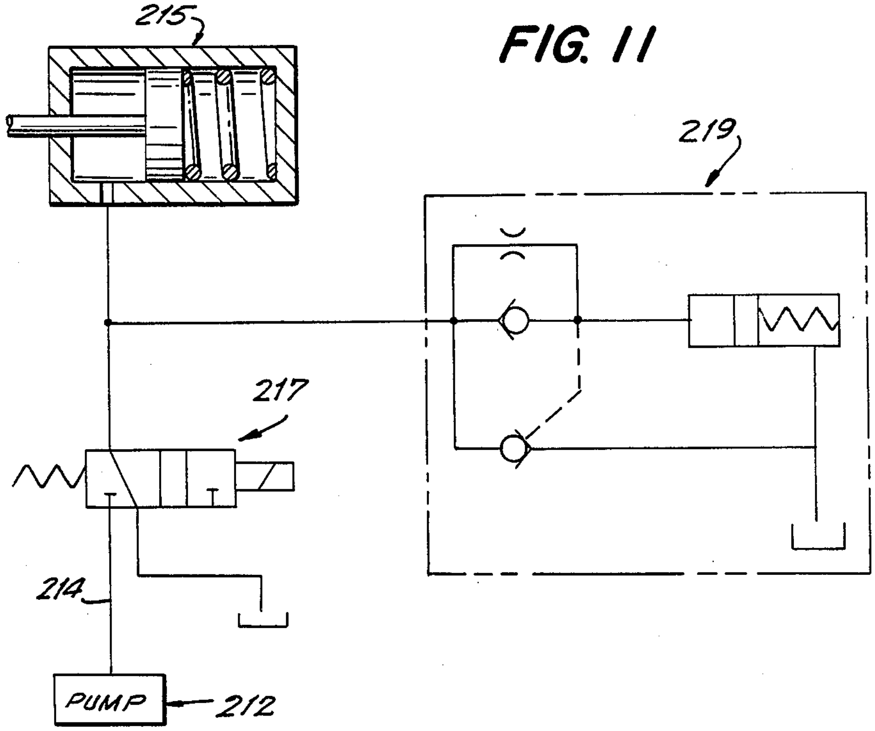
FIG. 11 is a schematic view of the hydraulic system including the ram and the pressure-drop sensor valve.

FIG. 11 illustrates a schematic rendering of a hydraulically operated ram and punch system using either inventive pressure-drop sensor valve 18 or 110. A flow source such as a pump 212 directs pressurized fluid through a flow line 214 to a hydraulic ram 215, which is connected to a punch (not shown). A valve for controlling fluid flow such as a solenoid-operated three-way control valve 217 is located on flow line 214. A pressure-drop sensor valve 219, such as pressure-drop sensor valves 18 or 110, operates to control the flow of pressurized fluid to ram 215 after the punch has penetrated the material to be punched.

As illustrated in FIG. 11, the valve 219 is not directly in series between the pump 212 and ram 215. However as described in the specification, for example in regard to FIG. 2, the valve can also be directly in series with valve 217 between the pump 212 and ram 215.

Although the fluid described in relation to pressure-drop sensor valves 18 and 110 is a liquid, such valve systems as described herein could be adapted to use a gas as the pressurized fluid.

Further, the pressure drop sensor valve in accordance with the invention is not limited in use solely to the field of sheet metal hole punching which is described herein for exemplary purposes. The valve can be used with other technologies, for example, with hydraulic stamping/forging presses, plastic injection molding equipment, etc.

Phase one of the operation of sensor valve 110, which is illustrated in FIG. 7, is the same as the phase one of sensor valve system 18 as illustrated in FIG. 2. In operational phase one of sensor valve 110, poppet valve 144 is in a closed position with poppet surface 160 pressed against poppet valve seat 158 so as to prevent fluid flow into return passage 122 from supply passage 114 via fluid passage 156. Piston 132 is in an extended position with inner end wall 187 positioned in non-abutting relationship with sleeve 130. Valve spring 176 is in its first biased mode wherein poppet valve 144 is maintained in its closed position. The unit pressure is the same throughout the entire valve system in phase one so that the unit pressure exerted by valve spring 176 need not overcome any opposing pressure. Return fluid flow escaping into return passage 122 is negligible during this time.

Figure 8:
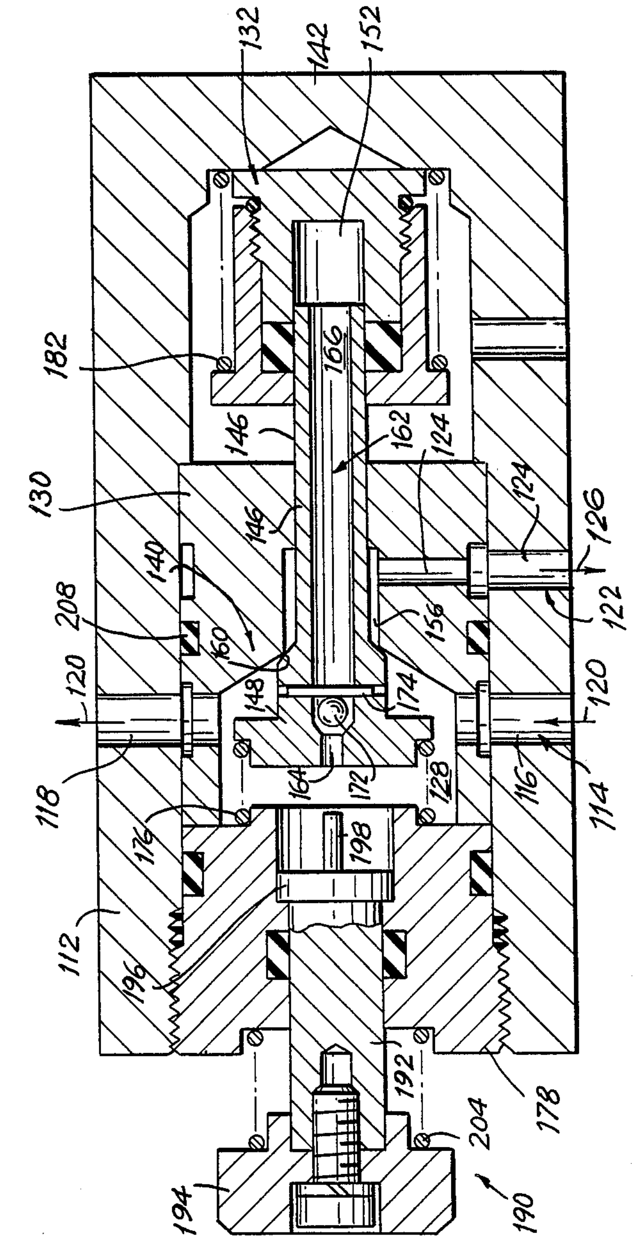
FIG. 8 is a cross-sectional view analogous to FIG. 3 illustrating the sensor valve with the manual seating mechanism during the second phase of the punching operation.

Phase two of the operation of sensor valve 144 illustrated in FIG. 8, which is analogous to phase two of the operation of sensor valve system 18 illustrated in FIG. 3, covers the start of the upside of the unit pressure curve in FIG. 1. When the ram pressure exceeds a certain unit pressure, e.g. 300 p.s.i. (see FIG. 1) in the embodiment of the invention under discussion, pressurized fluid at 300 p.s.i. from supply passage 114 and axial passage 162 exerts like pressure in accumulator chamber 152 as a flow of pressurized fluid passes through the area of ball-check valve 168. As a result, piston 132 is forced to move from its extended position illustrated in FIG. 7 toward its fully retracted position (see FIG. 8). Poppet valve 144 remains closed during this time due to the combined force of valve spring 176 and the force produced by fluid pressure within cavity 128 acting on the area of valve poppet seat 160, which combined force is opposite to and greater than the force produced by fluid pressure within cavity 152 acting on the area of poppet valve stem 146. Phase two of the operation of sensor valve 110 continues as the unit pressure at the ram exceeds a certain unit pressure, which in the embodiment of the invention being discussed is 480 p.s.i., and piston 132 is forced by the approximately 480 p.s.i. pressure in accumulator chamber 152 to be moved fully into its fully retracted mode as illustrated in FIG. 8. Piston spring 182 is fully biased in the retracted position of piston 132. Piston 132 is fully retracted in piston cavity 140 by pressure exerted against it by pressurized fluid in accumulator chamber 152 so that the rear wall of piston 132 is pressed against the inner surface of rear wall 142 of valve body 112. Ball 172 is contained by stop pin 174 against the force of the flow of pressurized fluid from fluid cavity 128 to accumulator chamber 152.

Phase two continues as the ram drives the punch against the panel to be penetrated and the fluid unit pressure of the system quickly rises to the operational upper unit pressure, which is 10,000 p.s.i. as illustrated in FIG. 1 in the embodiment of the invention under discussion.

Figure 9:
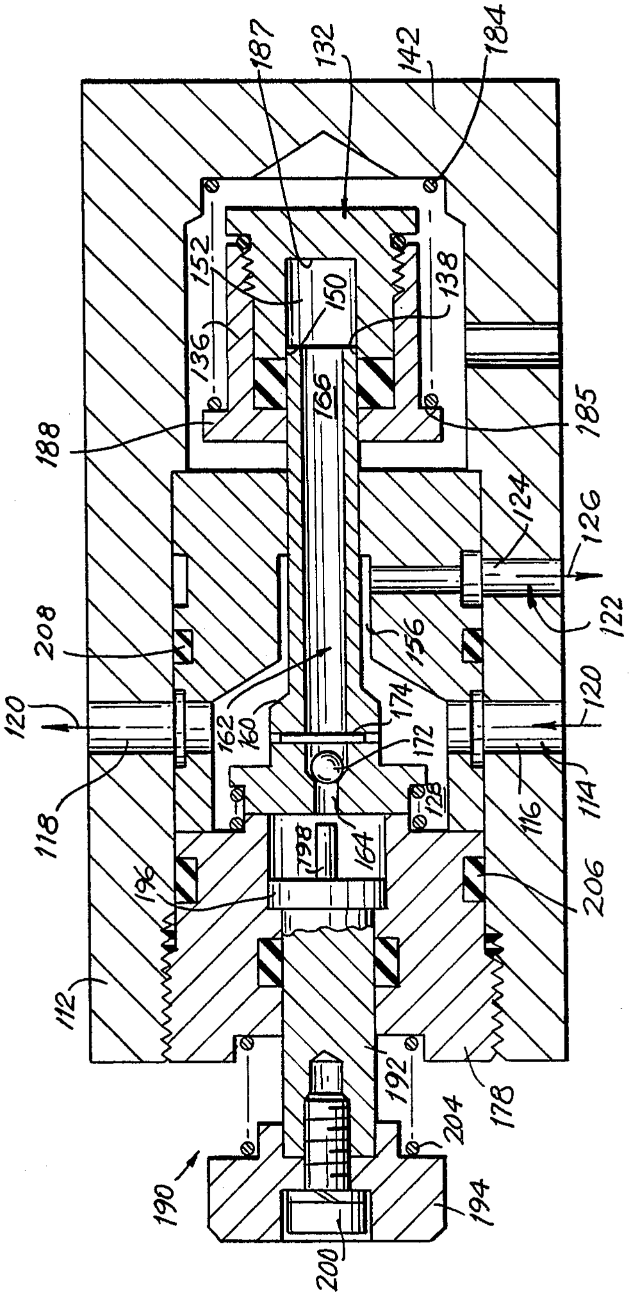
FIG. 9 is a cross-sectional view analogous to FIG. 5 illustrating the sensor valve with the manual seating mechanism during the fourth phase of the punching operation.

Phase three of sensor valve 110 illustrated in FIG. 9 which is analogous to phase three of sensor valve system 10 illustrated in FIG. 4, occurs immediately after the punch penetrates the panel. The pump and ram unit pressure rapidly drops from the upper operational unit pressure of approximately 10,000 p.s.i. to a unit pressure at which sensor valve 110 automatically vents the pump to reservoir, e.g. 480 p.s.i. as illustrated by point A in FIG. 1, so that the ram will not advance the punch against the die. At the point that the 10,000 p.s.i. unit pressure in accumulator chamber 152 is reduced to less than 480 p.s.i., piston 132 begins a motion from its retracted position illustrated in FIG. 8 toward its extended position as illustrated in FIG. 7 by reason of the bias exerted by piston spring 182, which exerts a unit pressure bias force of approximately 480 p.s.i., which is greater than the unit pressure of slightly less than 480 p.s.i. in fluid cavity 128.

FIG. 9 illustrates the closing of ball-check valve 168 by the movement of ball 172 into ball seat 170 caused by the movement of fluid from accumulator chamber 152 towards fluid cavity 128. The fluid movement results from the motion of piston 132 and the consequent displacement of fluid from accumulator chamber 152.

Phase four of sensor valve 110 illustrated in FIG. 9, which is analogous to phase four of sensor valve system 18 illustrated in FIG. 5, follows the closing of ball-check valve 168. Unit pressure exerted by the pump continues to fall from 480 p.s.i. to approximately 200 p.s.i. subsequent to the breakthrough of the panel by the punch. Piston 132 is moved by piston spring 182 which causes poppet valve 144 to slide in bores 138 and 149 and valve spring 176 to move from its partly biased position to its fully biased position, with valve 144 abutted against the inner end of plug 178. Poppet surface 160 is forced away from poppet valve seat 158 with the result that bypass 156 is opened and fluid from fluid cavity 128 passes into bypass 156 and outlet side 124 of return passage 122 and is finally vented from the system as return fluid 126.

The opening of poppet valve 144 causes the rapid arrest of motion by the hydraulic ram. The operator may then turn off the pump. Alternatively, the operator may close the shut-off valve (not shown) from the pump to supply passage 114. Poppet valve 144 is held in its open position and valve spring 176 held in its fully biased mode by way of the fluid trapped within accumulator chamber 152 since a pressure differential exists during phase four between fluid cavity 128 and accumulator chamber 152 with the unit pressure in accumulator chamber 152 being approximately 480 p.s.i. as produced by the action of spring 182. The biased force exerted by valve spring 176 in its fully biased mode is less than the opposing force produced by fluid pressure within cavity 152 acting on the area of poppet valve stem 146.

Figure 10:
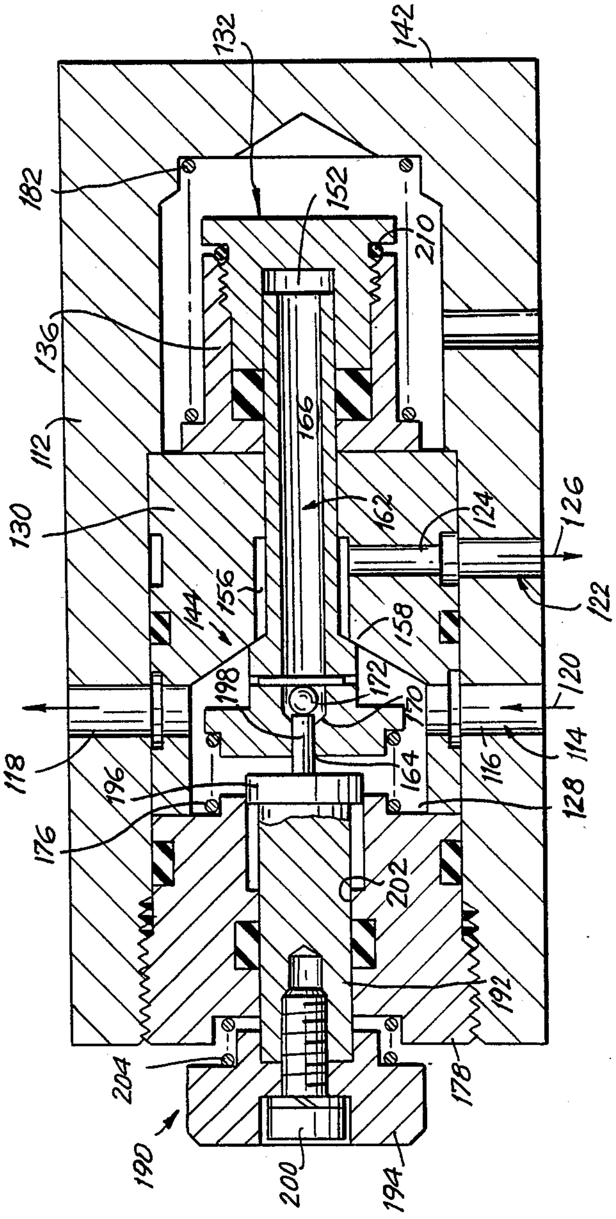
FIG. 10 is a cross-sectional view illustrating the sensor valve with the manual seating mechanism after the reseating of the poppet valve by operation of a manually operated plunger.

Phase five of the operation of sensor valve 110 illustrated in FIG. 10, which is analogous to phase five of sensor valve system 10 illustrated in FIG. 6, includes the reseating of poppet valve 144. After the pump is shut off, bias is applied by valve spring 176 to urge poppet valve 144 towards its closed position. This motion is opposed by the pressure in the accumulator chamber 152 and in axial passage 162 produced by spring 182. This pressure is applied at ball 172 so as to maintain ball 172 in ball seat 170. The fluid so trapped within cavities 152 and 166 keeps poppet valve 144 from reseating at poppet seat 158. At this time the operator pushes plunger 190 from its inactivated extended position shown in FIGS. 7–9 to its activated inward position shown in FIG. 10 so that rod 192 slides through bore 202 with the result that rod 198 extends through narrow portion 164 of axial passage 162 and moves ball 172 from ball seat 170. Rod 198 is slightly smaller in diameter than narrow portion 164. Thereupon pressurized fluid in axial chamber 162 flows around ball 172 and rod 198 through narrow portion 164 of axial passage 162 into fluid cavity 128 with the result that the pressure resisting the biasing force of valve spring 176 is removed. Poppet valve 144 then is biased to its closed position at poppet seat 158. The operator then releases plunger 190 so that plunger spring 204 is free to move from its biased mode to its generally unbiased mode thus forcing plunger 190 from its activated position to its inactivated position as illustrated in FIGS. 7–10. Ball 172 is also freed from ball seat 170 so as to open ball-check valve 168. The operator then starts the pump for the next punching operation.

The embodiments of the invention particularly disclosed and described hereinabove are presented merely as examples of the invention. Other embodiments, forms, and modifications of the invention coming within the proper scope and spirit of the appended claims will, of course, readily suggest themselves to those skilled in the art.

What is claimed is:

1. A pressure-drop sensor valve system for limiting the movement of a fluid-operated mechanism operating between upper and lower fluid pressures, comprising:

a valve body, first passage means extending through said valve body capable of passing pressurized fluid from a source of fluid to said hydraulic mechanism at varied pressures ranging between upper and lower pressures, return passage means in said valve body for passing a quantity of the pressurized fluid from said first passage means and discharging said quantity of pressurized fluid from said valve body, chamber means located in said valve body for holding a quantity of the pressurized fluid, first valve means positioned within said valve body in fluid communication with said first passage means and with said return passage means and movable between a closed position wherein said first valve means prevents passage of the pressurized fluid from said first passage means to said return passage means and an open position wherein said first valve means allows discharge of pressurized fluid from said first passage means to said return passage means, piston means positioned within said valve body in fluid communication with said chamber means and movable between a first piston position wherein said piston means displaces a first volume of pressurized fluid in said chamber means and a second piston position wherein said piston means displaces a second volume of pressurized fluid in said chamber means, said first volume being less than said second volume, second passage means extending through said first valve means for directing the pressurized fluid from said first passage means to said chamber means, second valve means positioned within said second passage means and movable between a first position wherein said second valve means allows passage of the pressurized fluid through said second passage means between said first passage means and said chamber means and a second position wherein said second valve means prevents flow of the pressurized fluid from said chamber means to said first passage means, said second valve means being moved to said second closed position when said piston means moves from said second piston position to said first piston position, said second valve means being held in said second position when the pressure in said chamber means is greater than the pressure in said first passage means, first biasing means within said valve body and acting on said piston means, said first biasing means being operational between a first biased mode wherein said first piston means is maintained at said first piston position, and a second biased mode exerting greater unit pressure than in said first biased mode when said piston means is in said second piston position, said piston means moving from said first to said second position when pressurized fluid in said first passage means is applied at a first pressure greater than said lower pressure and greater than the pressure exerted by said first biasing means in said second biased mode, and said piston means being moved from said second piston position to said first piston position by said first biasing means when the pressure in said first passage means falls to less than said first pressure, second biasing means mounted in said valve body and to said first valve means, said second biasing means being operational between a first biased mode wherein said first valve means is maintained in said closed position, and a second biased mode exerting greater pressure than said first biased mode, said first valve means being moved from said closed position to said open position when said second valve means is in said second position and said piston means moves from said second piston position toward said first piston position, the pressurized fluid being vented from said first passage means through said second passage means, allowing pressure release in said first passage means to said lower pressure.

2. The valve system according to claim 1, wherein said chamber means includes a chamber in said valve body, and said first passage means includes an inlet for connection to said source, an outlet for connection to said mechanism, and a cavity located in said valve body between and in fluid connection with said inlet and outlet.

3. The valve system according to claim 1, wherein said first valve means is a poppet valve including a stem and a head, said stem being slidably mounted in said valve body, said stem being located in said chamber and said head being located in said cavity, said poppet valve having a blocking surface located at the juncture of said stem and said head, said second passage means being an axial passage extending through said head and said stem, said axial passage being in fluid connection with said first chamber and with said cavity.

4. The valve system according to claim 3, wherein said second valve means includes a ball-check valve positioned within said axial passage, said ball-check valve including a ball, a ball seat, and a stop pin extending through said stem and said axial passage, said stop pin being spaced from said ball seat, said ball being located between said ball seat and said stop pin, said ball-check valve being in said closed position when said ball is in said ball seat and is in said open position when said ball is spaced from said ball seat.

5. The valve system according to claim 4, wherein said return passage means includes said valve body having a annular bypass passage and an outlet side passage, said bypass passage having an inlet in fluid connection with said cavity and being in fluid connection with said outlet passage, said bypass passage being radially spaced from said stem, said valve body forming a poppet valve seat at said inlet adapted to seat said blocking surface when said poppet valve is in said closed position.

6. The valve system according to claim 5, further including means for reseating said poppet valve against said poppet valve seat after the pump has been shut down and said poppet valve is in said open position, said means for reseating including said stop pin of said ball-check valve being a metering pin, wherein pressurized fluid in said axial passage flows past said pin into said cavity when the pressure in said axial passage is greater than the pressure in said cavity until the fluid pressure differential between said axial passage and said cavity are sufficiently reduced so that said second biasing means biases said poppet valve from said open position to said closed position.

7. The valve system according to claim 6, further including a sleeve member, said sleeve member forming said chamber.

8. The valve system according to claim 7, further including a piston cavity formed in said valve body, and wherein said piston means includes a piston member comprising a head portion and a rear portion, said rear portion being positioned in said piston cavity and said head portion slidably extending through said sleeve into said chamber, said rear portion being movable in said piston cavity between said first and said second piston positions wherein said head portion is extended into said chamber in said first piston position and is at leas partially withdrawn from said chamber in said second piston position.

9. The valve system according to claim 8, further including removable first and second end sealing portions positioned at opposed ends of said valve body, wherein said first end sealing portion in part defines said cavity, and said first biasing means is a first compression spring coiled around said head of said poppet valve, said first spring being braced between said head and said first sealing portion.

10. The valve system according to claim 9, wherein said second biasing means is a second compression spring coiled around said rear portion of said piston, said second compression spring being positioned in said piston cavity and braced between said rear portion and said second end sealing portion.

11. The valve system according to claim 5, further including a piston cavity formed in said valve body, and wherein said piston means includes a piston member positioned in said piston cavity and movable within said piston cavity between first and second piston positions.

12. The valve system according to claim 11, wherein said piston member includes a blind chamber, said stem of said poppet valve being positioned in said blind chamber so that said axial passage is in fluid connection with said blind chamber, said piston member being positioned proximate to said stem when said piston member is in said first piston position and said piston member being positioned distant to said stem when said piston member is in said second piston position.

13. The valve system according to claim 12, further including means for reseating said poppet valve against said poppet valve seat from said open position, said means for reseating including a plunger mechanism including a plunger rod having inner and outer ends, said outer end being extended from said valve body, a rod member connected to said inner end being axially aligned with and spaced from said narrow portion of said axial passage of said poppet valve, and a plunger compression spring operatively mounted to said plunger mechanism, said plunger mechanism being slidably movable in said body between an inactivated position and a manually activated position, in said inactivated position said rod member is spaced from said ball in its seated position and in said activated position said rod member is positioned at said ball seat unseating said ball from said ball seat, pressurized fluid in said axial passage being able to flow into said cavity when the pressure in said axial passage is greater than the pressure in said cavity until said second biasing means forces said poppet valve from said open position to said closed position, said plunger mechanism being biased back to said inactivated position by said plunger compression spring when the manual activation of said plunger mechanism ceases.

14. The valve system according to claim 1, wherein said piston means begins to move from said first position towards said second position at a second pressure in said passage means, said second pressure being less than said first pressure and greater than said lower pressure.

* * * * *

UNITED STATES PATENT AND TRADEMARK OFFICE
CERTIFICATE OF CORRECTION

PATENT NO. : 4,844,114

DATED : July 4, 1989

INVENTOR(S) : Gary Moberg and James Hobson

It is certified that error appears in the above-identified patent and that said Letters Patent is hereby corrected as shown below:

Title page:

Please change the assignee in this patent from:

"Contractor Tool and Equipment Textron Inc., Rockford, Ill"

to:

--Greenlee Textron Inc., Rockford, Ill--.

Signed and Sealed this

Twelfth Day of June, 1990

*Attest:*

HARRY F. MANBECK, JR.

*Attesting Officer*

*Commissioner of Patents and Trademarks*